F. W. PARDEE.
GROUNDING DEVICE FOR ELECTRICAL CONDUCTORS.
APPLICATION FILED JAN. 15, 1910.
1,013,305.
Patented Jan. 2, 1912.
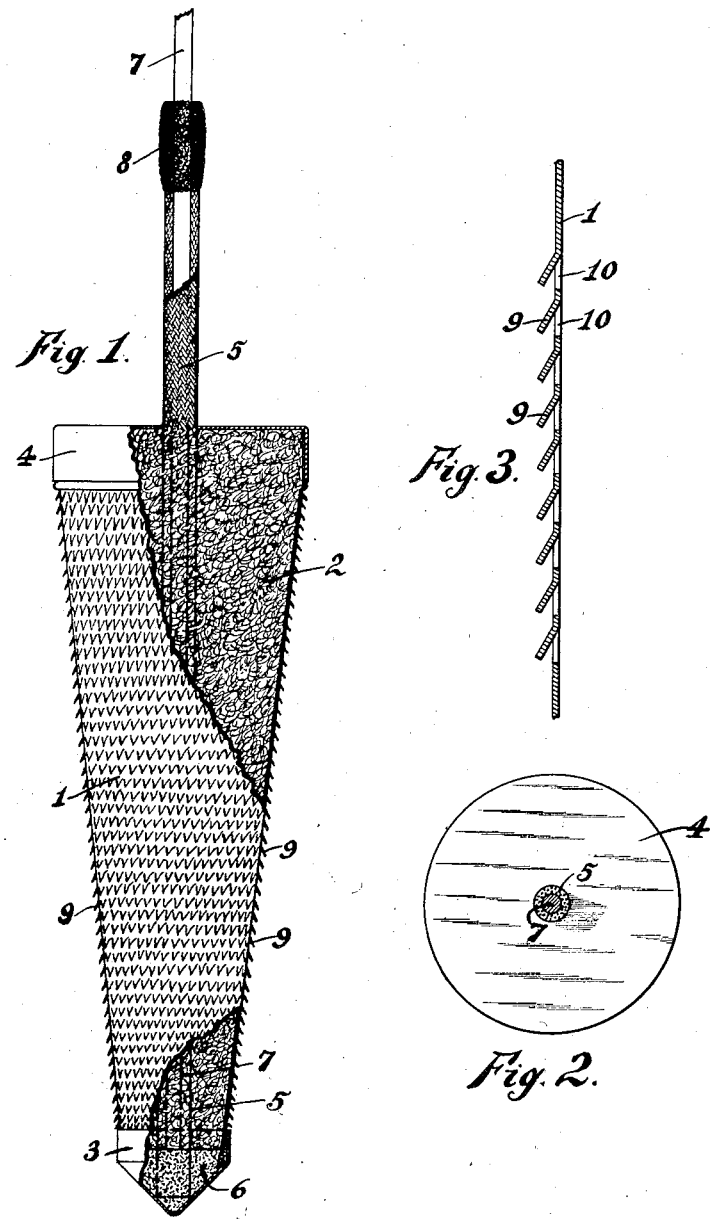

UNITED STATES PATENT OFFICE.

FRANK W. PARDEE, OF EVANSTON, ILLINOIS, ASSIGNOR TO PARAGON SELLERS COMPANY, OF CHICAGO, ILLINOIS, A CORPORATION OF ILLINOIS.

GROUNDING DEVICE FOR ELECTRICAL CONDUCTORS.

1,013,305.     Specification of Letters Patent.     Patented Jan. 2, 1912.

Application filed January 15, 1910. Serial No. 538,177.

*To all whom it may concern:*

Be it known that I, FRANK W. PARDEE, a citizen of the United States of America, residing at Evanston, county of Cook, and State of Illinois, have invented a new and useful Grounding Device for Electrical Conductors, of which the following is a specification, reference being had to the accompanying drawings, illustrating same.

My invention relates to grounding devices used for grounding various electrical conductors in various circuits and electrical systems.

The principal objects of my invention are, to provide an improved grounding device of the character herein set forth, and to also provide improved means for attaching a ground wire or conductor to the grounding device.

Other objects will be apparent from the following specification.

In the accompanying drawings illustrating the preferred form of my invention, Figure 1 is a side elevation of the device of the invention, with portions broken away to show the interior construction thereof; Fig. 2 is a top view of the device shown in Fig. 1; and Fig. 3 is a vertical cross-sectional view of a portion of the sheet metal cone shown in Fig. 1, showing the perforations of the metal and the formation of the discharge points thereon.

Like characters refer to like parts in the several figures.

The device of this invention consists essentially of a receptacle 1, preferably made from a perforated piece of sheet copper rolled into conical form, a moisture-collecting and moisture-retaining material 2, preferably charcoal or coke, within the sheet metal receptacle 1, a sheet metal cap 3 for closing the lower end of the receptacle 1, a sheet metal cap 4 for closing the upper end of the receptacle 1, and a hollow woven metallic cable 5, preferably made of copper wire, extending through the receptacle 1 preferably as shown.

The small end of the sheet metal portion 1, and the inner end of the copper cable 5, are preferably secured to the sheet metal cap 3 by a metallic solder 6 which is preferably run into the cap 3 as shown. Such a connection makes rigid electrical contact between the cable 5 and the sheet metal portion or casing 1.

In making the device, the copper cable 5 and the sheet metal casing 1 are first soldered in place into the cap 3 as described, then the casing 1 is filled with the charcoal or coke 2, and then the cap 4 is placed over the upper end of the casing 1, being preferably held in place by a small quantity of solder which rigidly holds it to the casing 1.

The hollow woven cable 5 extends out but a few inches from the large end of the casing 1, this extension of the cable 5 being adapted to receive a ground wire 7 when the grounding device is being installed, the ground wire 7 being inserted into the hollow cable 5 clear through the receptacle 1 to the solder 6 and then being secured to the cable 5 by a quantity of metallic solder 8 which is applied to the outer end of the cable 5 preferably as shown, this solder 8 penetrating between the strands of the woven cable 5 and uniting with the ground wire 7 so as to form a solid metallic contact between these parts. With this construction it is not necessary to extend the woven cable 5 clear up to the pole or line wire as has been customary heretofore, the ground wire 7 serving to make connection from the grounding device to the line wire or other conductor. Thus it will be seen that this method of connecting the ground wire 7 with the grounding device simplifies the grounding device and also cuts down the cost on account of saving a considerable length of woven cable 5. The woven cable 5 also has a gripping action on the ground wire 7.

It is well known that electricity discharges more readily from points than from a comparatively smooth surface. Therefore to cause the discharge of electricity from the grounding device to more readily take place, the metallic casing 1 is provided with numerous outwardly projecting points 9 9 thereon covering the body thereof preferably as shown, these points 9 9 being preferably V-shaped or angular in form and being formed out of the sheet metal casing 1 preferably as shown in Fig. 3. The points 9 9 being formed out of the metal portion 1 as shown, leave numerous perforations 10 10 through the sheet metal casing 1 preferably as shown in Fig. 3. In addition to this the points 9 9 serve to greatly increase the contact surface of the grounding device as a whole, with the material surrounding same when installed. The moisture collected by the charcoal or coke 2 may readily pass through the perforations 10 10 in the casing 1.

In installing the grounding device it is preferably buried in the earth, being preferably surrounded by a quantity of coke. Whatever may be the material surrounding the grounding device, the numerous discharge points 9 9 thereon serve to provide numerous paths for the conduction of electricity from the grounding device to the surrounding material and off through the earth, these points 9 9 greatly increasing the efficiency of such a device.

It will be readily understood that the device of this invention may be used for grounding various electrical line wires, or for grounding the ground wires from lightning arresters. In fact it may be used wherever a ground connection is desired. I also wish it to be understood that the device of the invention may be made in various forms, such as cylindrical, spherical, etc., and that the device illustrated may be used in various positions, such as horizontally, with the small end to the top and the hollow cable extending from the small end of the device, etc.

I do not wish to limit this invention to all of the particular details herein set forth, as various modifications of same may be made without departing from the scope of the appended claim. Neither do I wish to limit the projecting points 9 9 to any particular shape, as various shapes may be used under various conditions with good results.

What I claim as my invention is:

A grounding device of the character set forth, comprising a perforated sheet-metal receptacle having the material from the perforations turned outwardly to provide numerous pointed outwardly-projecting dischargers, and moisture-collecting material within the receptacle.

As inventor of the foregoing I hereunto subscribe my name, this 7th day of January, 1910.

FRANK W. PARDEE.

Witnesses:
P. B. GILROY,
F. MARIAN HAUPT.